US011038858B2

(12) United States Patent
Rohel et al.

(10) Patent No.: US 11,038,858 B2
(45) Date of Patent: *Jun. 15, 2021

(54) EDGE ENCRYPTION WITH METADATA

(71) Applicant: ServiceNow, Inc., Santa Clara, CA (US)

(72) Inventors: Pierre Francois Rohel, San Diego, CA (US); Siddharth Shah, Kirkland, WA (US); Martin Wexler, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,692

(22) Filed: Feb. 18, 2020

(65) Prior Publication Data
US 2020/0259808 A1 Aug. 13, 2020

Related U.S. Application Data

(63) Continuation of application No. 15/608,580, filed on May 30, 2017, now Pat. No. 10,594,670.

(51) Int. Cl.
*H04L 29/06* (2006.01)
*G06F 16/958* (2019.01)
(Continued)

(52) U.S. Cl.
CPC ........ *H04L 63/0485* (2013.01); *G06F 9/5083* (2013.01); *G06F 16/986* (2019.01);
(Continued)

(58) Field of Classification Search
CPC ............. H04L 63/0485; H04L 63/0428; H04L 67/1097; H04L 67/2852; G06F 21/6254; G06F 16/986; G06F 9/5083
See application file for complete search history.

(56) References Cited

U.S. PATENT DOCUMENTS 9,268,947 B1    2/2016   Jarlstrom et al.
9,852,165 B2 *  12/2017  Morozov .............. G06F 16/215
(Continued)

OTHER PUBLICATIONS

Servicenow, Products, "Edge Encryption", Encrypted Data Through Edge Encryption Proxy—What You See, Date Unknown, Downloaded Apr. 11, 2017, https://www.servicenow.com/products/edge-encryption.html, 3 pp.
(Continued)

*Primary Examiner* — Cheng-Feng Huang
(74) *Attorney, Agent, or Firm* — Fletcher Yoder PC

(57) ABSTRACT

Systems and methods are disclosed for encrypting portions of data for storage and processing in a remote network. For example, methods may include receiving a message that includes data for forwarding to a server device; encrypting a portion of the data to determine an encrypted portion; determining metadata based on the portion of the data, wherein the metadata indicates one or more properties of the portion of the data and enables one or more operations to be performed by the server device that depend on the one or more properties; determining a payload including the data with both the encrypted portion and the metadata substituted for the portion of the data; and transmitting the payload to the server device.

20 Claims, 11 Drawing Sheets

(51) Int. Cl.
  *H04L 29/08* (2006.01)
  *G06F 21/62* (2013.01)
  *G06F 9/50* (2006.01)

(52) U.S. Cl.
  CPC ...... *G06F 21/6254* (2013.01); *H04L 63/0428* (2013.01); *H04L 67/1097* (2013.01); *H04L 67/2852* (2013.01)

(56) References Cited

U.S. PATENT DOCUMENTS

| | | | |
|---|---|---|---|
| 2002/0116637 A1* | 8/2002 | Deitsch | G06F 21/305 726/12 |
| 2003/0093691 A1* | 5/2003 | Simon | H04L 63/20 726/4 |
| 2005/0149726 A1 | 7/2005 | Joshi et al. | |
| 2007/0055731 A1 | 3/2007 | Thibeault | |
| 2007/0079117 A1* | 4/2007 | Bhogal | H04L 9/00 713/160 |
| 2007/0244987 A1 | 10/2007 | Pedersen et al. | |
| 2010/0161821 A1 | 6/2010 | Slamkovic | |
| 2011/0113050 A1 | 5/2011 | Youn et al. | |
| 2011/0145580 A1 | 6/2011 | Auradkar et al. | |
| 2011/0145593 A1 | 6/2011 | Auradkar et al. | |
| 2015/0172255 A1* | 6/2015 | Warnez | H04W 12/04 713/168 |
| 2016/0352695 A1* | 12/2016 | Kozolchyk | H04L 67/1097 |
| 2017/0220464 A1 | 8/2017 | Gallagher et al. | |
| 2017/0279812 A1 | 9/2017 | Borlick et al. | |
| 2017/0344646 A1 | 11/2017 | Antonopoulos et al. | |
| 2018/0189193 A1 | 7/2018 | Bernat et al. | |

OTHER PUBLICATIONS

Fortrex, Fortrex.com, "Using Encryption and Access Control for HIPAA Compliance", White Paper, Vormetric and HIPAA Compliance, Date Unknown, Downloaded Apr. 11, 2017, http://www.fortrex.com/Documents/wp-Fortrex_WEB.pdf, 17 pp.

Mozilla, "Mixed Content", Mozilla Developer Network, Web Technology for Developers, Web Security, Date Unknown, Downloaded Apr. 11, 2017, https://developer.mozilla.org/en-US/doc/Web/Security/Mixed_content, 4 pp.

Oracle, "2 Protecting Data Within the Database", Oracle Security Overview, 10g Release 1 (10.1), Introduction to Database Security Concepts, Dec. 2003, Downloaded Apr. 11, 2017, 174 pp.

BMC, "System Communications", BMC Support Central, BMC Discovery 10.0, Pages, Documentation, Security, Last Modified on Aug. 17, 2015, Downloaded Apr. 11, 2017, https://docs.bmc.com/docs/display/DISC01 OD/System•communications, 5 pp.

\* cited by examiner

EDGE ENCRYPTION WITH METADATA

CROSS REFERENCE TO RELATED APPLICATIONS

The present application is a continuation of U.S. patent application Ser. No. 15/608,580, filed on May 30, 2017, entitled, "EDGE ENCRYPTION WITH METADATA", which is herein incorporated by reference.

BACKGROUND

Computing networks can be large and complex, consisting of many thousands of hardware and software components. Maintaining and operating a large network can present many challenges. Operations management functions for a private computing network can be performed by one or more remote servers in a software-as-a-service model. Data from a private network can be transferred to the one or more remote servers for storage and/or to enable operations management functions. Some of the data transferred to a remote server may be sensitive and may be encrypted for transmission to and storage by the one or more remote servers.

SUMMARY

Disclosed herein are implementations of edge encryption with metadata.

In an implementation, a system is provided for encrypting portions of data for storage and processing in a remote network. The system includes a memory and a processor. The memory includes instructions executable by the processor to cause the system to receive a message that includes data for forwarding to a server device; encrypt a portion of the data to determine an encrypted portion; determine metadata based on the portion of the data, wherein the metadata indicates one or more properties of the portion of the data and enables one or more operations to be performed by the server device that depend on the one or more properties; determine a payload including the data with both the encrypted portion and the metadata substituted for the portion of the data; and transmit the payload to the server device.

In an implementation, a method is provided for encrypting portions of data for storage and processing in a remote network. The method includes receiving a message that includes data for forwarding to a server device; encrypting a portion of the data to determine an encrypted portion; determining metadata based on the portion of the data, wherein the metadata indicates one or more properties of the portion of the data and enables one or more operations to be performed by the server device that depend on the one or more properties; determining a payload including the data with both the encrypted portion and the metadata substituted for the portion of the data; and transmitting the payload to the server device.

In an implementation, a system is provided for discovering components of a computer network in a secure manner. The system includes a memory and a processor. The memory includes instructions executable by the processor to cause the system to invoke a discovery probe against a target device to obtain probe data that includes attributes of the target device; identify an attribute from the probe data that is of an attribute type having a matching encryption profile; and generate a payload to be communicated to a server device, wherein the payload includes an encrypted value of the identified attribute and metadata generated based on the identified attribute, and wherein the metadata enables one or more operations to be performed by the server device that depend on properties of the identified attribute.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
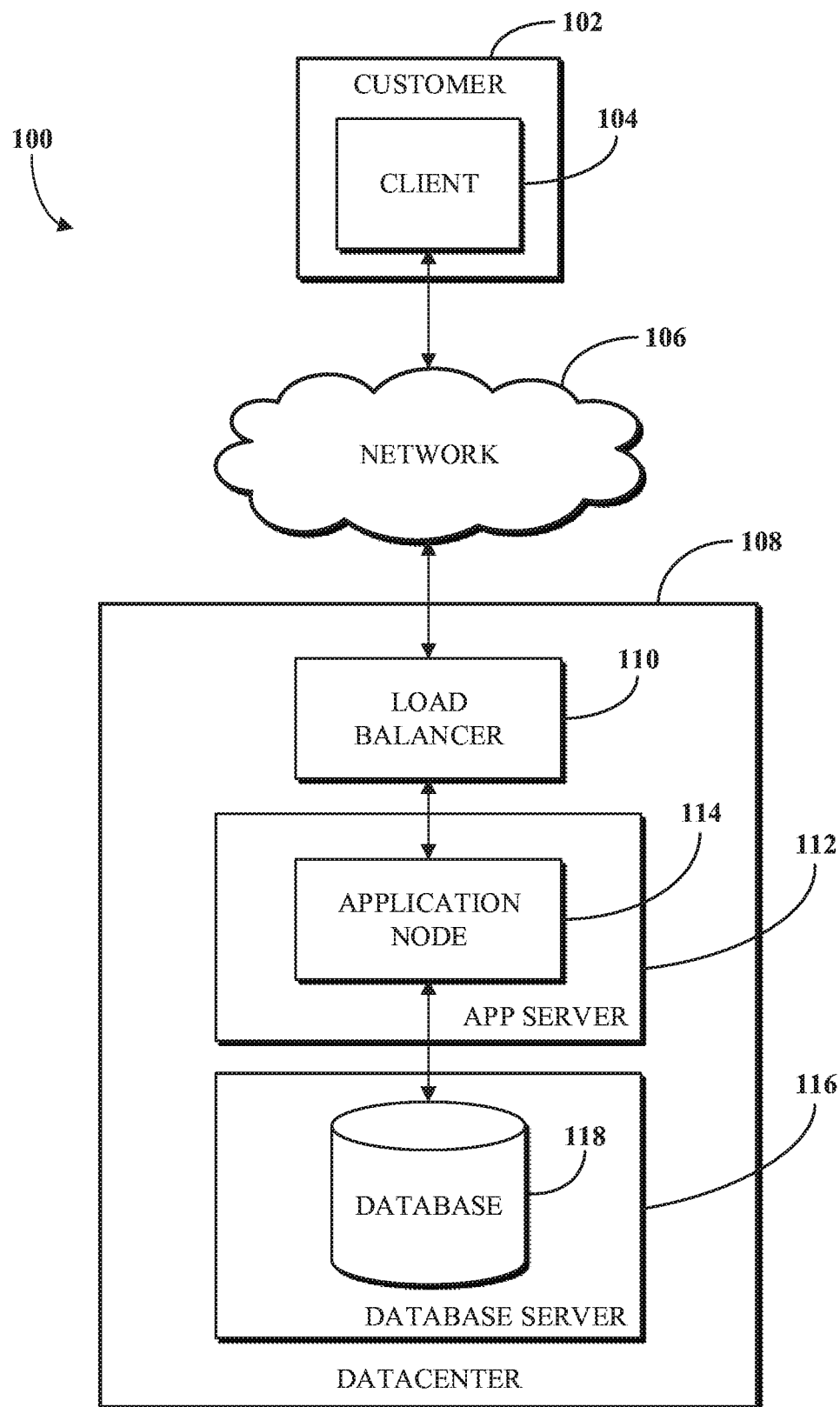
FIG. 1 is a block diagram of an example of an electronic computing and communications system in accordance with the present disclosure.

In software-as-a-service models of network computing, large amounts of data from a private network may be stored outside of the private network to facilitate the provision of services, such as operational configuration and maintenance of computing resources in the private network. For example, such data may be stored by an external service provider on a server device at a remote location. Customers of the external service provider may want to encrypt sensitive data (e.g., IP addresses, host names, credentials, Social Security numbers, etc.) that is stored at the remote location to reduce the risk of a data breach. To mitigate this risk, portions of data deemed sensitive may be encrypted for transmission to and storage by the external service provider. The data may be encrypted with an encryption key that is not available to the service provider, so that the service provider can store this data in encrypted form without having access to the unencrypted values of the data. In the event of a network security breach at the external service provider, the data encrypted with the key of the private network is not compromised. This model of encryption may be called edge encryption and is often performed at a proxy server or gateway that relays data between the private network and the external service provider.

Encrypting the data sent to the external service provider may limit the external service provider's ability to perform operations that depend on the values of the encrypted data. For example, a service provider may store a database that includes records representing computing devices in a customer's private network. These records may include IP addresses of the respective computing devices. Because IP addresses may be used in attempts to attack a network, the IP addresses in these records may be encrypted by an edge encryption proxy/gateway in the private network for storage in the service provider's database. For example, the fields for IP addresses in the database may hold cypher-text rather than clear-text IP addresses. Now suppose a user working from the private network invokes a database query against the database to find all devices in the private network with an IPV6 address. Normally, the database query, using an application programming interface (API) provided by the service provider, would be able to search records including the IP addresses, interpret the IP addresses to determine which are IPV6, and return all matching records. But when cypher-text is stored in the IP address fields, the standard API functions will be unable to correctly identify which IP addresses have the property of interest (i.e., which IP addresses are IPV6 addresses). In this manner, the use of edge encryption may disable functions normally offered by a service provider.

To address this problem, an edge encryption proxy/gateway that encrypts sensitive portions of data before sending them to an external service provider for storage may also generate metadata that indicates one or more properties of a portion of the data being encrypted and enable the service provider to perform operations that depend on the one or more properties. For example, the edge encryption proxy/gateway may, upon determining that a portion of data (e.g., an IP address) being relayed to the service provider will be encrypted, may determine properties of the portion of data needed to support functions provided by the service provider (e.g., the property of whether an IP address is an IPV6 address). Metadata indicating these properties may then be encoded (e.g., using an interface description language such as a Protocol Buffer) (an attribute of a target device) and included, along with the encrypted data, in a payload of data forwarded to the service provider for storage. The metadata may indicate the one or more properties without revealing all the information of the data that has been selected for edge encryption.

The service provider receiving the payload may store the encrypted portion of data in a database and also store the metadata in a manner that is associated with the encrypted portion of data. A server in the service provider's environment may be configured to, upon receiving a request (e.g., a database query), determine whether the value in a field of a record is encrypted and access any metadata associated with the encrypted data. The server may use the metadata to perform an operation (e.g., an operation from a standard API, such as IS_IPV6( )) and determine and return a result that depends on a property indicated by the metadata. In this manner, a set of operations (e.g., an API) provided by a service provider may be supported in the presence of edge encryption.

Implementations of this disclosure provide technological improvements particular to computer networks, for example, those concerning processing of data subject to edge encryption. Computer network-specific technological problems, such as an inability to process encrypted data to provide services to a private network from an external network, can be wholly or partially solved by implementations of this disclosure. For example, metadata is generated that describes properties of portions of data that are encrypted in an edge encryption proxy/gateway, and the metadata is forwarded to an external server with the encrypted data to enable the server to perform functions that depend on the properties. Implementations of this disclosure can thus introduce new and efficient improvements in the ways in which data exchanged between a private network and an external service provider are processed by providing metadata to enable functions to be performed in an external platform instance that depend on properties of encrypted data.

To describe some implementations in greater detail, reference is first made to examples of hardware structures. FIG. 1 is a block diagram of an example of an electronic computing and communications system 100 in accordance with the present disclosure. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

In some implementations, the client 104 can be an instance of an application running on a customer device associated with the customer 102. As used herein, the term "software" can include, but is not limited to, applications, programs, instances, processes, threads, services, plugins, patches, application version upgrades, or any other identifiable computing unit capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, or path. In some implementations, a client 104 associated with the customer 102 can connect to, or communicate via, the network 106 using a distinct connection point, link, or path. A connection point, link, or path can be wired, wireless, use other communications technologies, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

In some implementations, maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, any number of application servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 stores, manages, or otherwise provides data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

In some implementations, one or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and techniques described herein can operate or be executed on or by the servers associated with the system 100. For example, the client 104 may receive data for transfer to the application server 112, where the data includes hints that portions of the data should be encrypted prior to transfer, and the client 104 may encrypt portions of the data selected based on the hints prior to transferring the data to the application server 112. For example, the client 104 may generate metadata reflecting properties of portions of data being encrypted for transfer to the application server 112, and the metadata may be transferred, along with the encrypted data, to the application server 112. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. In some implementations, the primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared, such that multiple installations or instantiations of web servers, application servers, database servers, or combinations thereof can be installed on the same physical server. An installation can be allocated a portion of the physical server resources, such as RAM, storage, communications bandwidth, or processor cycles.

In some implementations, a customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
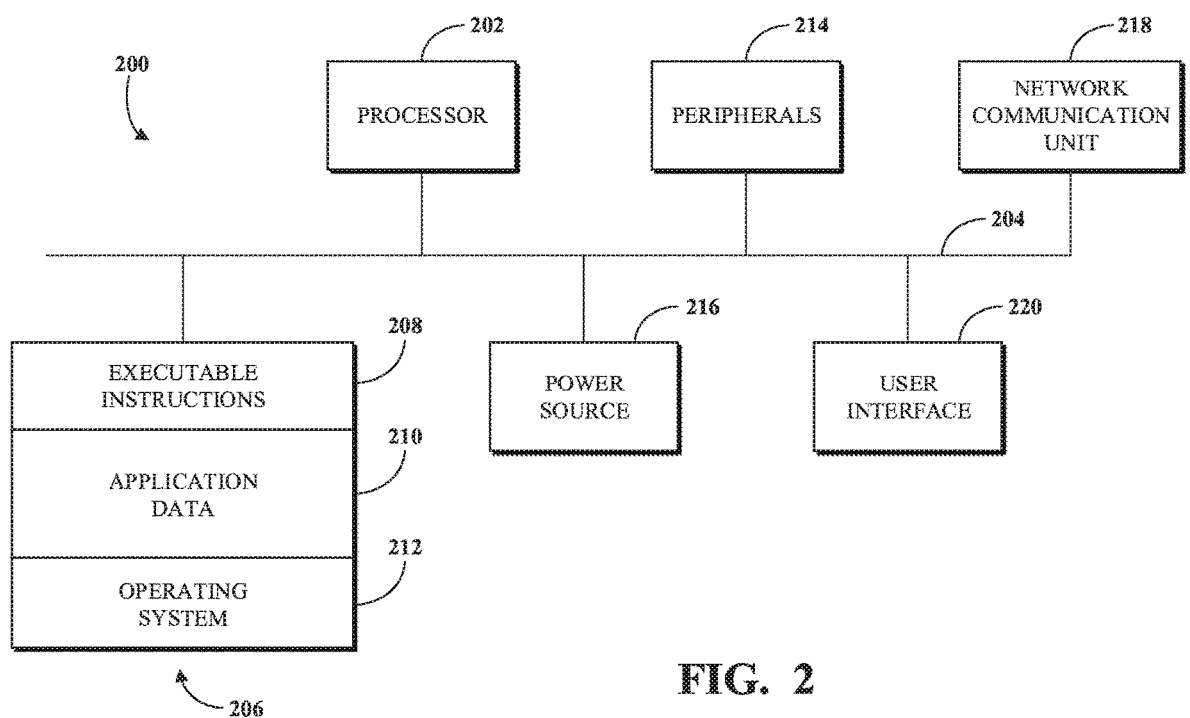
FIG. 2 is a block diagram of an example of an internal configuration of a computing device of an electronic computing and communications system in accordance with the present disclosure.

FIG. 2 is a block diagram of an example of an internal configuration of a computing device 200 of an electronic computing and communications system in accordance with the present disclosure. The computing device 200 can be a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions. The operations of the processor 202 can be distributed across multiple clients or servers, which can be coupled directly or across a local area or other suitable type of network.

In some implementations, the memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to receive data for transfer to a remote server, where the data includes hints that portions of the data should be encrypted prior to transfer, and encrypt portions of the data selected based on the hints prior to transferring the data to the remote server.

For example, the executable instructions 208 can include instructions to generate metadata reflecting properties of portions of data being encrypted for transfer to a remote server, and the metadata may be transferred, along with the encrypted data, to the remote server.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, or an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
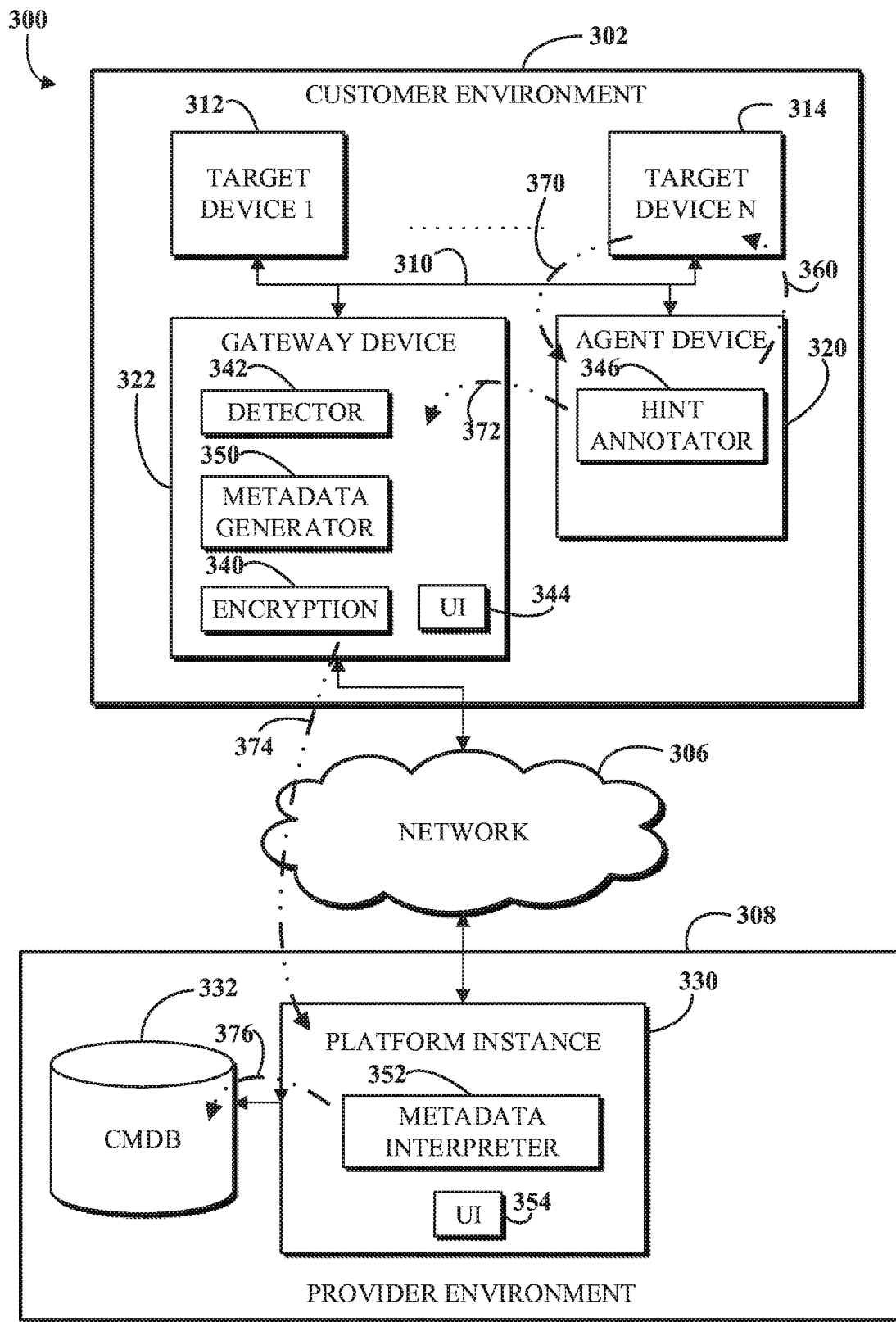
FIG. 3 is a block diagram of a system for edge encryption within a computing infrastructure.

FIG. 3 is a block diagram of a system 300 for edge encryption within a computing infrastructure (such as the system 100 of FIG. 1). Data from a customer environment 302 is relayed through a gateway device 322, across a network 306, to a platform instance 330 in a provider environment 308. As the data passes through the gateway device 322, sensitive portions of the data may be identified by a detector module 342 and encrypted by an encryption module 340. The encryption module 340 may use an encryption key of the customer environment 302 that is unavailable within the provider environment 308. Thus, the platform instance 330 may lack unencrypted access to sensitive portions of data that it stores (e.g., in a CMDB 332) in an encrypted format for the customer environment 302. A metadata generator module 350 generates metadata for portions of the data selected for encryption at the gateway device 322. This metadata is sent with the encrypted data to the platform instance 330. The metadata may reflect properties of the encrypted portions of the data and may enable the platform instance 330 to perform functions that depend on the encrypted data without decrypting the encrypted data by using a metadata interpreter module 352. The system 300 can, for example, be implemented using some or all of the electronic computing and communications system 100. For example, the network 306 can be implemented using the network 106, and the platform instance 330 can be implemented using platform software executing on one or more application nodes 114 and data stored on one or more databases 118. For example, the platform software may be used to implement the metadata interpreter module 352. For example, the CMDB 332 may be implemented by storing its associated data in the databases 118.

The system 300 includes a customer environment 302 that interacts with devices and modules of a provider environment 308. The devices and modules of the customer environment 302 can communicate with the devices and modules of the provider environment 308 via the network 306 (e.g., the Internet or some other wide area network). The provider environment 308 can be implemented by or in one or more of the datacenter 108 of FIG. 1. The customer environment 302 can be implemented by or in one or more of the customer 102 of FIG. 1. For example, a customer environment may be bounded by one or more firewalls that separate the customer environment from the network 306.

The customer environment 302 may include a number of devices connected by a customer network 310 (e.g., a firewalled local area network), including, for example, one or more target devices, such as a target device 312 and a target device 314, an agent device 320, and a gateway device 322. The agent device 320 includes a hint annotator module 346 for marking sensitive data it sends to the platform instance 330 for encryption at the gateway device 322. The gateway device 322 includes a detector module 342, a metadata generator module 350, an encryption module 340, and a user interface 344 module. In some implementations, the customer environment 302 can include networks and/or devices (such as the target device 312 and target device 314) controlled (wholly or partially) by a customer, for example, a customer of a PaaS service provider. In some implementations, a provider environment can have limited access to a customer environment. In some implementations, a customer environment can have limited access to a provider environment.

The provider environment 308 includes a platform instance 330 (e.g., running on a server device) and a configuration management database (CMDB) 332 (e.g., running on a database server). The platform instance 330 includes a metadata interpreter module 352 and a user interface (UI) 354. The platform instance 330 can be, or can be a module of, the application node 114 of FIG. 1. The CMDB 332 can be, or can be a part of, the database 118 of FIG. 1. In some implementations, the provider environment 308 can include networks and/or devices controlled (wholly or partially) by a provider, for example, a service provider of a Platform as a Service (PaaS) service. Thus, the provider environment can refer to networks and devices implemented within a datacenter under the control of a provider. In some implementations, the provider environment can also, or instead, refer to networks and devices outside of a datacenter, within multiple datacenters, or any other networks, devices, and/or software under the control of a provider.

The platform instance 330 can initiate discovery of computing resources in the customer environment 302 by instructing the agent device 320 to invoke discovery probes and return probe data to the platform instance 330. Probe data is relayed through the gateway device 322, and the gateway device 322 encrypts one or more portions of the probe data before transmitting those portions outside the customer environment 302. The one or more portions are identified based on indication rules or detector rules indicating that the one or more portions are to be encrypted. As such, clear text values for such one or more portions are not available outside the customer environment 302.

In an example scenario, the agent device 320 invokes a discovery probe 360 against a target device, such as the target device 314, via the customer network 310, to obtain probe data 370. A discovery probe can include one or more commands that extract, or derive, probe data regarding the target device. The probe data can include attributes of the target device. The probe data can be stored in a CI representing the target device, or relationships involving the target device, in the CMDB 332 as described with respect to FIG. 1. Non-limiting examples of discovery probes include a discovery probe that determines probe data relating to the Internet protocol (IP) address of a target device, a discovery probe that obtains probe data including the operating system and version of the operating system operable on the target device, discovery probes that obtain probe data including installed software on the target device, and a discovery probe that obtains probe data including whether a specific process is executing on a target device.

The agent device 320 can invoke the discovery probe 360, for example, upon receiving a command including the discovery probe 360 from the platform instance 330. In some implementations, devices in the provider environment 308, such as the platform instance 330, can initiate commands to devices, such as the agent device 320, in the customer environment 302. As such, the platform instance 330 can issue the command (such as via an HTTP request, an API request, a REST request, a socket connection, or the like) to the agent device 320.

In some implementations, devices in the provider environment 308 cannot initiate commands to, via initiating communications to, devices in the customer environment 302 when, e.g., the agent device 320 is behind a firewall. As such, the agent device 320 receives the command including the discovery probe 360 via an external communication channel (ECC) queue (not shown). The ECC queue can be used to organize the communications between the platform instance 330 and the agent device 320. Communications between the platform instance 330 (or other devices in the provider environment 308) and the agent device 320 (or other devices in the customer environment 302) can be queued in the ECC queue. The agent device 320 can be configured to contact the platform instance 330 on a periodic basis to retrieve commands including discovery probes from the ECC queue to be invoked by the agent device 320.

The agent device 320 receives the probe data 370 from the target device 314. The hint annotator module 346 can determine whether any of the portions of the probe data 370 are to be encrypted prior to communicating the probe data 370, e.g., out of the customer environment 302, such as to the platform instance 330 in the provider environment 308. If the hint annotator module 346 determines that one or more portions of the probe data 370 are to be encrypted, then the hint annotator module 346 generates an indication that the one or more portions of the probe data 370 are to be encrypted. One indication can be generated for the one or more portions of the probe data to be encrypted; multiple indications, including one indication for each portion of the probe data to be encrypted, can be generated; or other correspondence between one or more indications and one or more portions of the probe data may be used. An indication marks, designates, tags, identifies, or otherwise indicates a portion of the received data for encryption.

For example, the received probe data 370 can be structured data or can be converted by the agent device 320 into structured data, such as structured data of properties. Non-limiting examples of structured data include XML data, JSON data, and name/value pairs. The one or more pointers to the one or more portions of the data to be encrypted can include the names of attributes in the probe data.

The hint annotator module 346 can generate the indications of the one or more portions of the probe data to be encrypted based on indication rules configured for the agent device 320. For example, a user interface can be used to configure indication rules. The user interface can be the user interface 344 of the gateway device 322, can be a user interface (not shown) of the agent device 320, or can be the user interface 354 provided by the platform instance 330. In some implementations, the hint annotator module 346 can generate the indications based on hint data received in the probe data 370 from a target device. For example, an administrator of the customer environment 302 can include configurations on some of the target devices, such that the configurations indicate which portions of the probe data 370 are to be encrypted. As such, the probe data 370 returned from a target device can be configured to include relevant hint data from the configurations. In some implementations, hint data can be made available in the agent device 320. For example, configured rules (e.g., regular expressions or data type filters) can be used to parse the received probe data 370 to determine which portions of the probe data 370 are to be encrypted.

In some implementations, the rules for selecting probe data for encryption may be included in a discovery probe script that is invoked against the target device 314. For example, the edge encryption for discovery probe data may be configured by an administrator of the customer environment 302 through the user interface 354, accessed from a device in the customer environment 302 (e.g., using a web browser). The administrator may specify rules (e.g., regular expressions or data type filters) for selecting probe data for edge encryption at the gateway device. The rules may be incorporated into a discovery probe script that is delivered to the agent device 320 for invocation within the customer environment 302. And the rules may be applied by the hint annotator module 346 to the probe data 370 from the target device 314 to generate an indication of which portions of the probe data 370 should be encrypted at the gateway device 322.

The agent device 320 generates a message 372 including data to be relayed through the gateway device 322 to the platform instance 330. The message 372 includes at least some of the probe data 370. The message 372 may also include the indication, which identifies one or more portions to be encrypted by the gateway device 322. The indication can be added to the message 372, such as at the beginning of the message 372, at the end of the message 372, or within the probe data, such as proximate to the portion to be encrypted. The indication can be in data accompanying the message 372. The indication can include a header that includes one or more pointers to the one or more portions of the message 372 to be encrypted. For example, the message 372 can be a sequence of data bytes (or characters). As such, the pointers can include start byte offsets within the message 372 to the one or more portions of the probe data 370 to be encrypted. The indication can also include a length and/or an end byte offset for the one or more portions of the probe data 370 to be encrypted. In some implementations, the message, including the probe data and the indication, is a self-describing file.

The agent device 320 transmits, to the gateway device 322, the message 372 that includes the probe data 370 with the indication. The gateway device 322 receives the message 372 including data for forwarding to a server device, such the platform instance 330. The gateway device 322 can forward some of the data to the server device.

The gateway device 322 encrypts data indicated for encryption before the data are transmitted, via the network 306, to the platform instance 330 in the provider environment 308. An additional layer of encryption (e.g., transport encryption, such as SSL or TLS) can be configured between the customer environment 302 and the provider environment 308. As such, an additional level of encryption can be applied to the encrypted data (i.e., as encrypted by the gateway device 322). The data can remain encrypted (as encrypted by the gateway device 322) while stored (e.g., in the CMDB 332) in the provider environment 308. The encrypted data can be sent from the provider environment 308 to the customer environment 302 via the gateway device 322 when requested by, for example, an operator in the customer environment 302. The encrypted data can be decrypted by the gateway device 322 before being used by a device within the customer environment 302.

As described above, the data encrypted by the gateway device 322 can be one or more portions of the message 372 (including probe data) from the agent device 320. The data encrypted by the gateway device 322 can be, instead or additionally, a portion of a message received by the gateway device 322 for forwarding to a server device, such as the platform instance 330. For example, the message can be a web-based request, such as one entered via a client, such as the client 104, operable in the customer environment 302.

The gateway device 322 can be configured as a proxy, such that messages (e.g., web-browser requests, other network requests, or probe data) from a device in the customer environment 302 (e.g., the client 104 of FIG. 1) to a device in the provider environment 308 (e.g., the platform instance 330) can be routed through the gateway device 322. The gateway device 322 uses encryption rules to identify in a message, such as a web-request, whether any portion of the message is to be encrypted. If so, the gateway device 322 can encrypt the portion of the message before forwarding the message to, for example, the platform instance 330.

In response to the message, the platform instance 330 may send a response (e.g., an HTTP response). Responses from devices in the provider environment 308, such as the platform instance 330, can be configured to be routed through the gateway device 322. As such, the gateway device 322 determines, based on the encryption rules, whether the response contains encrypted data. If so, then the gateway device 322 can decrypt the encrypted data according to the decryption rules before forwarding the response to the initiator of the request (e.g., a client such as the client 104 of FIG. 1). Non-limiting examples of requests (i.e., messages) include web-requests initiating from a browser, SOAP requests, and REST requests. Other types of requests can generate messages to be forwarded via the gateway device 322 (e.g., configured as a proxy) to a server device in the provider environment 308.

The detector module 342 detects, in the received probe data, which one or more portions of the probe data are to be encrypted based on the indication of the one or more portions generated by the agent device 320. The detector module 342 can identify additional portions to be encrypted. For example, the detector module 342 can identify a portion to be encrypted including the one or more portions of the received data based at least in part on the indication or based on configurations of the gateway device 322.

The detector module 342 can determine a match between the identified portion of the data and a pattern. The identified portion of the data can be identified based in part on the match. For example, the pattern can be based on or defined in one or more configurations of the gateway device 322. The configurations can be provided via the user interface 344. Non-limiting examples of patterns (i.e., field names and encryption patterns) are provided herein. Other types of patterns are also possible.

Via the user interface 344, for example, encryption rules can be provided for the gateway device 322. The encryption rules can include which portions of data received by the gateway device 322, such as the probe data, are to be encrypted and which encryption profile to use for the portions. The encryption rules can include attribute names. When the detector module 342 identifies the attribute name (such as by parsing the data) to identify an identified attribute (e.g., identified portion), the detector module 342 identifies the attribute value associated with the attribute name as a portion to be encrypted. The encryption rules can include encryption patterns. The detector module 342 can identify portions to be encrypted based on detecting the encryption patterns in the message 372. The encryption patterns can specify string patterns to be replaced by encrypted tokens. The encryption patterns can be regular expression patterns, simple character sequences, or some other type of pattern. Other encryption rules are also possible. The encryption rules can associate an encryption profile with an attribute type.

An encryption profile for a portion can be one of an Advanced Encryption Standard (AES) 256-bit encryption, a AES 128-bit encryption, an equality preserving AES 256-bit encryption, an equality preserving AES-128 bit encryption, an order preserving AES-256 bit encryption, or an order preserving AES 128-bit encryption. Other or additional encryption profiles are possible. The portions or attributes encrypted by the gateway device 322 and stored in the CMDB 332 can be used to perform operations. Such operations can include performing database queries, user interface operations, or the like including filtering, sorting, grouping, ordering, comparing, and the like. Identified portions or identified attributes encrypted with the AES 256- or 128-bit encryption profiles cannot be filtered, sorted, or compared. Identified portions or identified attributes encrypted with the equality preserving AES 256- or 128-bit encryption profiles can be filtered using equality comparisons. Identified portions or identified attributes encrypted with the order preserving AES 256- or 128-bit encryption profiles can be sorted, and equality comparison filtering can be used on them.

The encryption module 340 encrypts the identified portion of the data. The encryption module 340 encrypts the identified portion using an encryption key. The encryption key can be stored on a secure device in the customer environment 302. The secure device can be a device that is not accessible to the provider environment 308. For example, the secure device can be a device that resides behind a firewall that blocks access from devices outside the customer environment 302. The secure device can be a device that cannot be discovered by a discovery operation. That is, the secure device may not respond to at least some discovery probes.

The encryption key can be stored in a key storage mechanism. The encryption key can be stored in a file system file. The file system file can be stored on the file system of the gateway device 322 or can be stored on a file system that is accessible to the gateway device 322. The encryption key can be stored in a key store, such as a Java KeyStore. The encryption key can be stored in a network attached encryption (NAE) key store. Other key storage mechanisms are also available.

For example, the key used by the encryption module 340 can be received from a key server. A key server can be a device, such as the device 200 of FIG. 2, that provides cryptographic keys to other devices, systems, or modules, such as the gateway device 322 or the encryption module 340. In some implementations, the key server can be operated by an entity that does not operate a device of the provider environment 308. That is, the key server can be operated by an entity other than the provider that operates the provider environment 308. For example, encryption keys used for edge encryption at the gateway device 322 may be managed by a service such as CyberArk or SafeNet.

The metadata generator module 350 determines whether metadata for a portion of data to be encrypted is to be determined. The portion of data to be encrypted can be a portion of data in any data that the gateway device 322 forwards or transmits to a device in the provider environment 308, such as the platform instance 330. For example, the portion of data to be encrypted can be, as described above, a portion of data in probe data received from the agent device 320 or a portion of data in another type of message (e.g., a web request). For example, a portion of data to be encrypted at the gateway device 322 may be an IP address, a host name, an operating system (OS) version, an OS patch level, a uniform resource locator (URL), a class, a name, a Social Security number, a credit card number, a credential (e.g., a login and/or password), a binary large object (BLOB), a journal field, or attachments during import via REST & SOAP.

The metadata for a portion of data indicates one or more properties of the portion of data. The metadata can be a set of properties that describe and/or give information about the portion of data. The metadata enables one or more operations to be performed by a device, system, or technique that does not have access to the portion of data (i.e., the value before encryption). For example, as the portion of data is encrypted before transmission to the platform instance 330, the platform instance 330 does not have access to the unencrypted value. The metadata enables the platform instance 330 to perform operations that can depend on or use the properties of the metadata. The operations can depend on or use one or more properties.

The metadata generator module 350 can determine which metadata to generate based on configuration data of the gateway device 322. A configuration rule can identify for a field name or a string pattern which metadata to generate. A configuration rule can be composed of conditions identifying whether metadata is to be generated and actions identifying which metadata to generate. Alternatively, or additionally, the metadata generator module 350 can determine whether to generate metadata based on an indication, such as an indication included in the message. The indication can indicate the one or more properties of the portion of the data to be generated. The value of a property can be a subset of the portion of data (e.g., a substring), a value inferred from the portion of data, a value extracted from data accompanying the portion of data where the accompanying data are not part of the portion of data, or some other value.

As a non-limiting example, the conditions of a configuration rule can indicate that metadata should be generated for an HTTP request that ends with the path "/listprocessor.do" and where the request includes the request parameter "forwardTo." The action can indicate which properties are to be extracted. When the request "server.company.com/listprocessor.do?forwardT o='https://secure.company.com:8080/table=users&type=query&name=jack&title=ceo" is received by the gateway device 322 from a device with an IP address of 192.168.10.25, additional request header information can also be received. The IP address 192.168.10.25 can be received in the request header "X-Forwarded-For." As the request ends with the path "/listprocessor.do" and includes the request parameter "forwardTo," the gateway device 322 extracts properties according to the actions of the configuration rule. The gateway device 322 can determine, for example, the following properties and corresponding values:

1) Requestor=192.168.10.25 (The property can be extracted from the header request header X-Forwarded-For),
2) Requestor location=San Diego (The property can be derived from the IP address),
3) Request type="query" (The property can be extracted from the "type" parameter),
4) Served by="secure.company.com:8080" (The property can be extracted from the "forwardTo" parameter),
5) Summary="searching for executives" (The property can be derived based on the fact that the Request type is a query and that the parameters include "title=ceo"),
6) Domain="company.com" (The property can be a substring of the host "server.company.com"), and
7) Port=80 (As no port is specified after server.company.com, and as the request is an HTTP request, the port can be assumed to be the default port 80 for HTTP requests).

The indication or the configuration rule can indicate that the portion of data associated with the forwardTo parameter and/or the Requestor properties, which are IP addresses, are to be encrypted. As such, additional metadata indicating one or more additional properties for the IP addresses can be determined as illustrated with respect to FIG. 9.

In some implementations, a token, such as a randomly generated token, can be used to identify and mask a particular pattern of characters within a portion of the data. As such, the encryption module 340 can mask a subset of the portion of data to be encrypted. For example, a Social Security pattern of characters "###-##-####" (where a # character indicates a numeric character) can be defined, and the encryption module 340 can be configured to mask a Social Security number in a portion of data instead of encrypting the portion of data. As such, a portion of data to be encrypted containing a comment "Please help Joe Smith (SSN: 123-45-6789)" may be substituted with "Please help Joe Smith (SSN: fu8bcng05)." The sequence of characters "fu8bcng05" can be a randomly generated token. The comment can be, for example, a comment related to an Incident Report to be stored in a database, such as the CMDB 332. As such, when an operation requesting the display of the comment is received via the gateway device 322 at the platform instance 330, the masked value can be unmasked by the gateway device 322, and the unmasked value is forwarded by the gateway device 322 to the requester for display. When the request is not received via the gateway device 322, the masked value can be transmitted for display.

Figure 8:
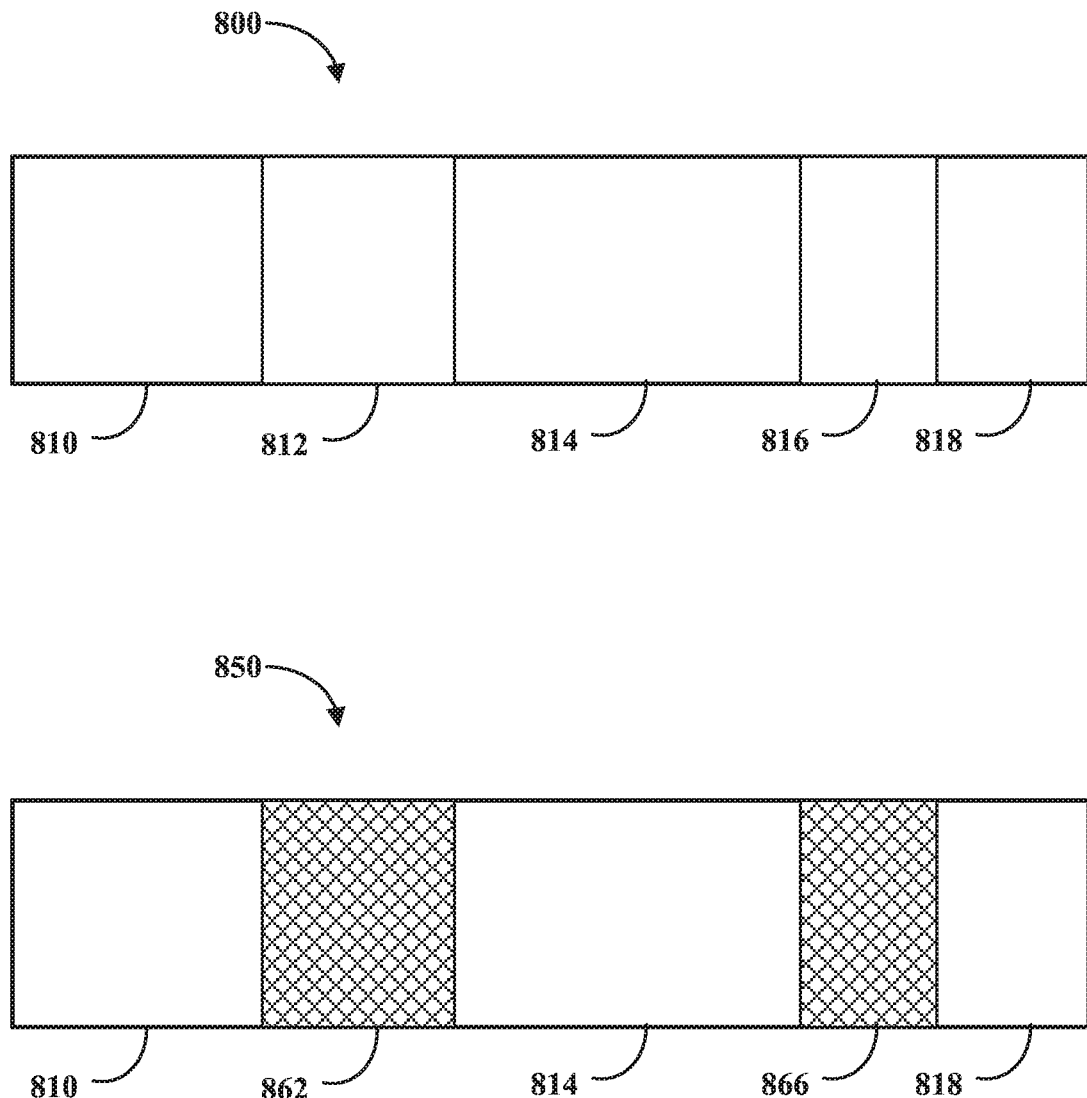
FIG. 8 is an illustration of generating a partially encrypted payload based on received data for transfer to a remote server.

The gateway device 322 generates a payload 374. A payload 374 can be sent from the gateway device 322 to, and to be processed by, a device in the provider environment 308, such as the platform instance 330. The payload 374 can include the encrypted portion and one or more unencrypted portions of the received data. The payload 374 can include unencrypted portions of the message 372 for portions of data not identified as portions to be encrypted. That is, an identified portion of the data can be omitted (i.e., excluded, not included) in the payload 374. A portion identified as a portion to be encrypted can be substituted with encrypted data. The payload 374 can include corresponding metadata generated by the metadata generator module 350 for a portion to be encrypted. "Substituted" can mean changing the portion identified as a portion to be encrypted in the data received by the gateway device 322. "Substituted" can mean copying, into a new data message, the received data, or portions thereof, not identified as portions to be encrypted and adding the encrypted data and corresponding metadata to the new data message. Other ways of generating the payload 374 are available. The gateway device 322 can include additional information in the payload 374 prior to transmitting to the platform instance 330. FIG. 8 illustrates an example of generating a payload.

The gateway device 322 transmits the payload 374 to a device in the provider environment 308, such as the platform instance 330. The platform instance 330 receives the payload 374. The platform instance 330 stores data from the payload 374, including the encrypted portion 376, in a database, such as the CMDB 332. The encrypted portion 376, as described above, includes one or more portions that are encrypted. For example, an encrypted portion can be associated with a column of a record of a table of the CMDB 332. The platform instance 330 stores the encrypted portion 376 in an associated database record.

The platform instance 330 can also store, to the CMDB 332, metadata associated with the encrypted portion. The metadata is stored in a manner that is associated with the encrypted portion 376. For example, the metadata can be stored in the same database record associated with the encrypted portion. For example, the CMDB 332 can include a table for metadata information. The table can include a reference to the column associated with the encrypted portion 376. The platform instance 330 can store the metadata and the reference to the column in the metadata table. For example, some of the metadata can be stored as separate entries (e.g., database records) in the CMDB 332. For example, a portion of the metadata reflecting a property of the encrypted data can be stored in the CMDB 332 according to a type of the property. Other ways of storing the metadata in a manner that is associated with the encrypted portion 376 are available.

The metadata interpreter module 352 can use the metadata to perform an operation. For example, a request to perform an operation can be received at the platform instance 330. For example, the request can be initiated via the user interface 354. For example, the request can be initiated by a user visiting a web page providing access to reports, via the user interface 354.

To process the request, the platform instance 330 can access data from the CMDB 332. For example, the operation can be a query for data in the CMDB 332. For example, the operation can request that a summary report be generated, based on received parameters, for data in the CMDB 332. Other operations are possible.

At least one of the data of the CMDB 332 required to process the operation can be an encrypted portion 376 saved to the CMDB 332 as described above. The platform instance 330 can access the encrypted portion 376 in the CMDB 332. The platform instance 330 can determine that the encrypted portion 376 is encrypted. The platform instance 330 can determine that the encrypted portion 376 is encrypted based on determining that metadata is associated with the encrypted portion 376, based on configuration information of the platform instance 330, or based on some other methodology. Responsive to determining that the encrypted portion 376 is encrypted, the platform instance 330 can access the metadata. The platform instance 330 can access the metadata via the metadata interpreter module 352. The metadata interpreter module 352 can perform the operation to obtain a result using the metadata. As a non-limiting example of a request, to fulfil the request for the operation that invokes the report "from which cities are users accessing the system?" the metadata interpreter module 352 can use the metadata property "Requestor location" described above. After using the metadata to obtain a result, the result can be transmitted by the platform instance 330 to the requester.

Various implementations of the system 300 are available. For example, implementations may omit the metadata generator module 350 and the metadata interpreter module 352. For example, implementations may omit the hint annotator module 346 and the detector module 342. For example, an indication can be included in the message 372 that is used by the metadata generator module 350 to determine whether to generate metadata and how to generate metadata (e.g., instead of or in addition to configuration data stored in the gateway device 322).

Figure 4:
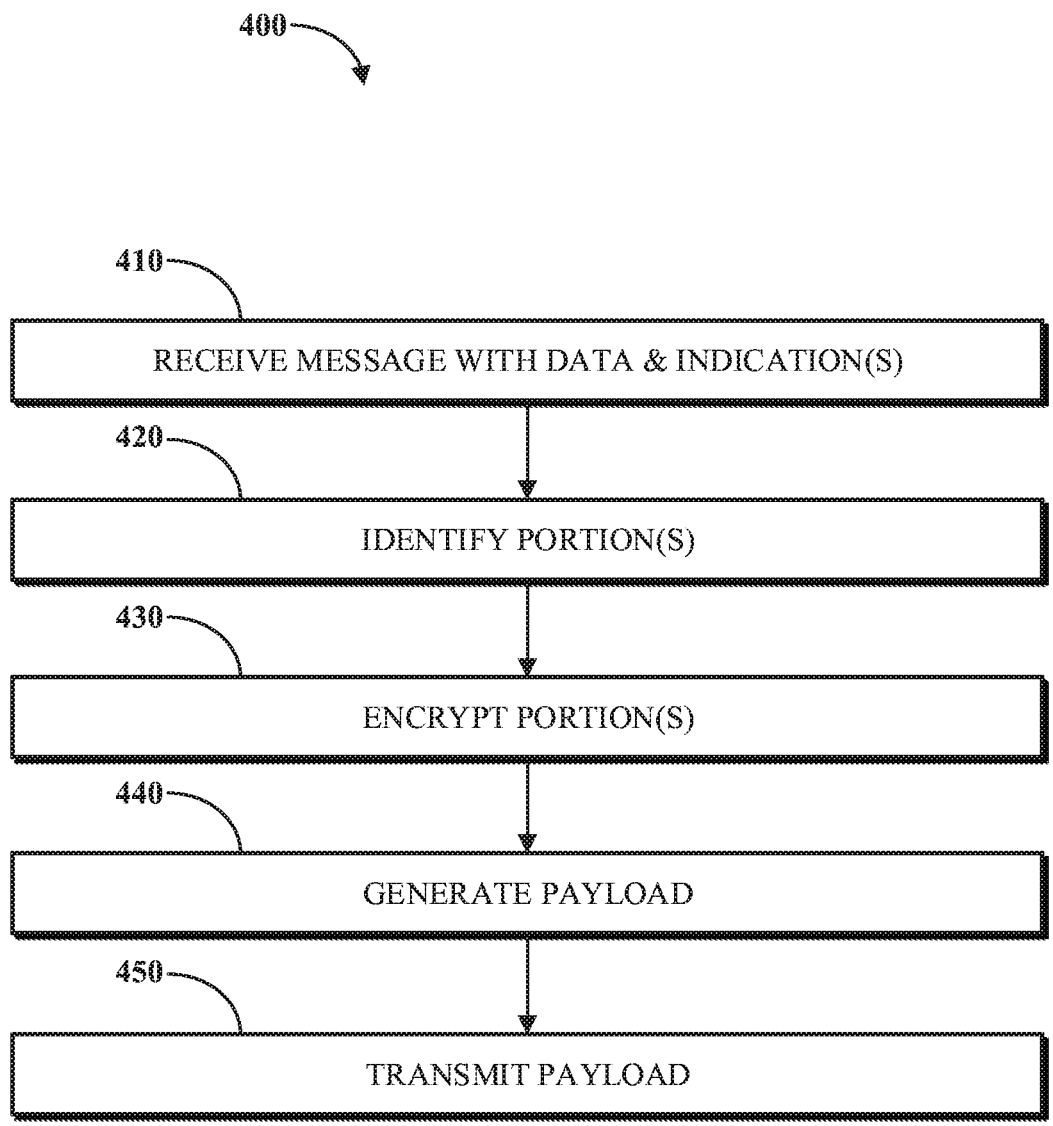
FIG. 4 is a flowchart illustrating an example of a technique for encrypting portions of data for storage in a remote network.

FIG. 4 is a flowchart illustrating an example of a technique 400 for encrypting portions of data for storage in a remote network in an electronic computing and communications system. In some implementations, the technique 400 can be executed using computing devices, such as the systems, modules, and devices described with respect to FIGS. 1, 2, and 3. In some implementations, the technique 400 or any other technique, method, process, or algorithm described in connection with the implementations disclosed herein can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

In some implementations, the technique 400 includes receiving a message with data and one or more indications, at operation 410; identifying portions to be encrypted, at operation 420; encrypting the identified portions, at operation 430; generating a payload, at operation 440; and transmitting the payload, at operation 450. For example, the technique 400 can be executed by a device operable in a customer environment, such as the gateway device 322 operable in the customer environment 302.

At operation 410, the technique 400 receives the message. The message includes data to be forwarded to a server device. The server device can be a device operable in a provider environment. For example, the device can be used to implement the platform instance 330 in the provider environment 308. The message can include one or more portions that are marked for encryption prior to forwarding to the server device. For example, the message can be a message as described with respect to FIG. 3. For example, the message can include probe data and be generated according to the technique of FIG. 5. For example, the message can be the message 372 as previously described with respect to FIG. 3.

At operation 420, the technique 400 identifies a portion of the message to be encrypted. The portion identified at operation 420 can include the one or more portions that are marked for encryption in the received message. The portion identified at operation 420 to be encrypted can include additional portions not marked for encryption in the message. In some implementations, the portion of the message to be encrypted can be identified as described with respect to the detector module 342 of FIG. 3. For example, a portion of the message to be encrypted may include an IP address, a host name, an operating system (OS) version, an OS patch level, a uniform resource locator (URL), a class, a name, a Social Security number, a credit card number, a credential (e.g., a login and/or password), a binary large object (BLOB), a journal field, or attachments during import via REST & SOAP. For example, the portion may be identified using the detector module 342 as previously described with respect to FIG. 3.

In some implementations, rules for identifying sensitive data for encryption may be directly configured in an edge encryption proxy/gateway. For example, regular expressions (e.g., matching an expected format for an IP address or a Social Security number) may be applied to data relayed through the edge encryption proxy/gateway, to identify (at operation 420) data for encryption. For example, a user interface, including drop-down menus for selecting data types and other properties of data, may be provided for specifying rules for parsing relayed messages to identify (at operation 420) sensitive data.

At operation 430, the technique 400 encrypts the portion identified at operation 420. The technique 400 can encrypt the portion, resulting in an encrypted portion, using an encryption key and an encryption method that are not known or not available to the provider environment 308 or any device of the provider environment 308. For example, the portion may be encrypted using the encryption module 340 as previously described with respect to FIG. 3.

At operation 440, the technique 400 generates a payload. The payload can include the encrypted portion of the data, encrypted via operation 430, and one or more unencrypted portions of the data. The technique 400 omits the identified portion of the data from inclusion in the payload. At operation 450, the technique 400 transmits the payload to the server device.

In some implementations, the technique 400 includes determining a match between the identified portion of the data and a pattern. Determining a match can be carried out as described with respect to the detector module 342 of FIG. 3. The identified portion of the data can be identified based in part on the match. The pattern can be a regular expression. The pattern can be specified in a graphical user interface, such as the user interface 344 of FIG. 3.

The indication of one or more portions of the received data to be encrypted can include a header that includes one or more pointers to the one or more portions of the received data to be encrypted. The indication can be configured as described with respect to FIG. 3. In some implementations, encrypting the identified portion of the data, via operation 430, can include receiving a key from a key server operated by an entity that does not operate the server device. The receiving the key can be as described with respect to the encryption module 340 of FIG. 3.

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

For example, the technique 400 can also include operations for updating the software of a gateway device, such as the gateway device 322 of FIG. 3. The operations include transmitting a request to update software of a gateway device including encrypted data, receiving a command to update software, checking whether the command includes the encrypted data, and, responsive to determining that the command includes the encrypted data, updating the software.

For example, the request can be initiated, via the user interface 344, by a user (e.g., a system administrator). In some implementations, an administrative console, presented in the user interface 344, can indicate that a software update is available. For example, the display region 1010 of FIG. 10 may be presented to the user. The user can transmit the request by activating a user interface element (e.g., the re-install icon 1050) to transmit the request. For example, the user (such as an administrator of the gateway device 322) can receive a notification (such as from the platform instance 330) indicating that a software update is available. The user can transmit the request by responding to the notification. For example, the gateway device 322 can transmit the request to relay the request initiated by the user through a user interface (e.g., the user interface 344 or the user interface 354). For example, the update request message coming from a user of a device within the customer environment 302 may be relayed through the gateway device 322 (just like other messages relayed through the gateway device 322 to the platform instance 330), and a portion of the update request message may be encrypted by the encryption module 340 (as described in relation to operation 430). Other ways of transmitting the request to update the software are available.

The request to update software can include data encrypted using a key associated with the gateway device. One key can be used for one request to update software. Alternatively, one key can be used with more than one request to update software. Data encrypted using the key can be included in the request so that, for example, it can be determined that the request was initiated from within the customer environment 302 via communications relayed through the gateway device 322. The data encrypted using the key can be any data, such as random data, that is known by the gateway device 322 so that the use of a valid encryption key associated with the customer environment 302 may be verified.

The command to update software is received from the server device. The command includes the data encrypted using the key associated with the gateway device. That is, the server device can include, in the command to update the software, the data encrypted using the key associated with the gateway device (i.e., the encrypted data included in the request to update software transmitted by the gateway device).

The command received from the server device is checked to determine whether it includes the data encrypted using the key associated with the gateway device. The data included in the command can be the encrypted data transmitted with the request to update software. In some implementations, the command includes the software update. For example, the software update can be an installable package that can be installed on the gateway device. For example, the software update can include a compressed package, such as a zip, tar, jar, or like file, which constitutes the software update. For example, the command can include executable instructions, such a script, or a redirect link, which can be used to retrieve and perform the software update to be installed.

In some implementations, the key associated with the gateway device can include a key pair (e.g., a public key and a private key). The private key can be securely retained by the gateway device 322 or securely retained within the customer environment 302. The public key can be available to the provider environment 308. The public key can be used by a device within the provider environment 308, such as the platform instance 330, to encrypt communications, including software update commands, to the customer environment 302. In the provider environment 308, the public key can be associated with the customer environment 302 and/or with the gateway device 322.

In some implementations, the private and public key pair can be generated by the gateway device or another device in the customer environment 302. In some implementations, the private and public key pair can be generated by a separate mechanism, such as a key generator executed within the customer environment 302, and can be transmitted to, or be accessed by, the gateway device 322. In some implementations, an encrypted private and public key pair can be uploaded to the provider environment 308, for example, for storage in a database. In some implementations, the platform instance 330 can transmit the private and public key pair to the gateway device 322, which can include storing the private and public keys within data stores used by the gateway device.

For example, the command received from the server device may include data encrypted by the server device using the public key associated with the gateway device. Checking whether the command comprises data that was encrypted using the key associated with the gateway device may include decrypting, by the gateway device, the data using the private key associated with the gateway device. For example, determining that the command comprises the data that was encrypted using the key associated with the gateway device may include successfully decrypting the data using the private key.

Figure 5:
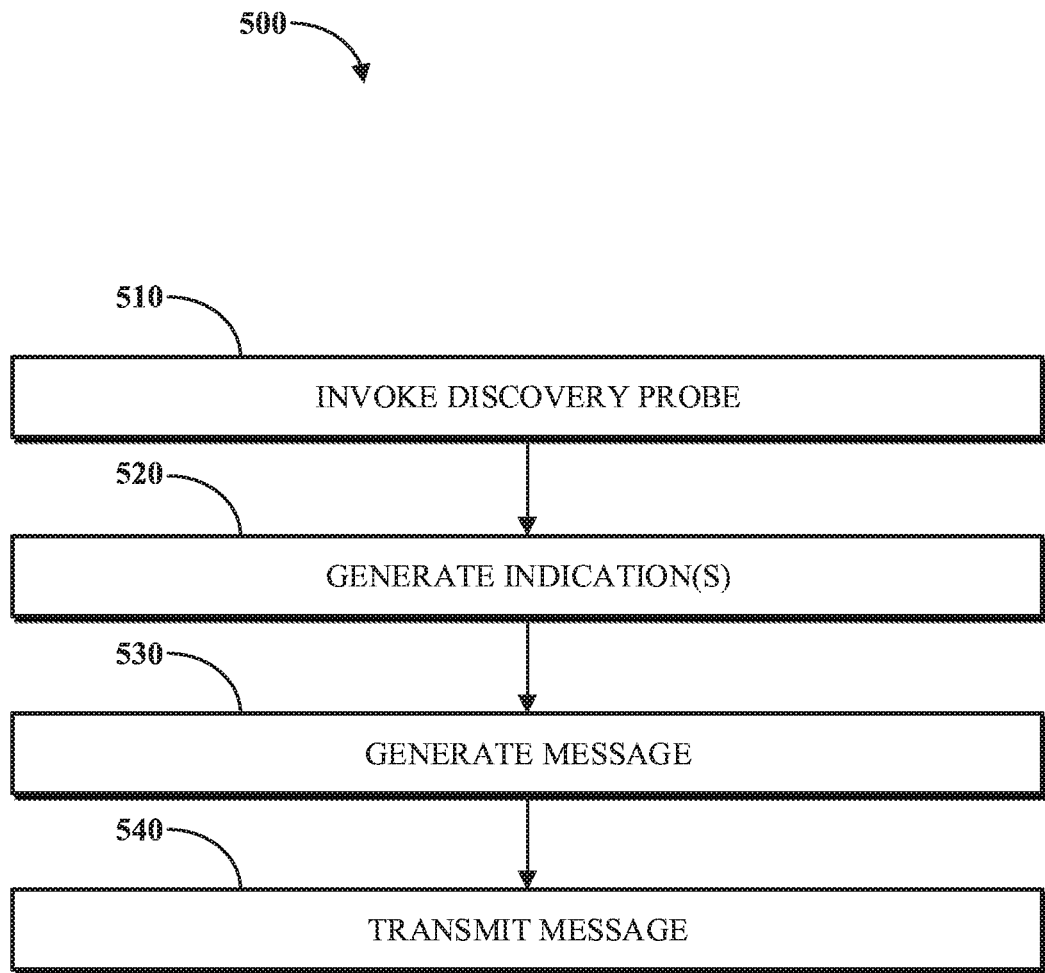
FIG. 5 is a flowchart illustrating an example of a technique for generating a message.

FIG. 5 is a flowchart illustrating an example of a technique 500 for generating a message in an electronic computing and communications system, such as the system 100 as generally illustrated in FIG. 1. In some implementations, the technique 500 can be executed using computing devices, such as the systems, modules, and devices described with respect to FIGS. 1, 2, and 3. In some implementations, the technique 500 can be performed, for example, by executing a machine-readable program or other computer-executable instructions, such as instructions or programs described according to JavaScript, C, or other such instructions. The steps, or operations, of the technique 500 or any other technique, method, process, or algorithm described in connection with the implementations disclosed herein can be implemented directly in hardware, firmware, software executed by hardware, circuitry, or a combination thereof.

The technique 500 can discover components of a computer network, such as the customer environment 302 of FIG. 3, in a secure manner. In some implementations, the technique 500 includes invoking a discovery probe, at operation 510; generating indications of one or more portions of the probe data, at operation 520; generating a message, at operation 530; and transmitting the message, at operation 540. For example, the technique 500 can be implemented by an agent device, such as the agent device 320 of FIG. 3. The technique 500 can generate the message for transmission to a gateway device, such as the gateway device 322 of FIG. 3.

At operation 510, the technique 500 invokes a discovery probe against a target device to obtain probe data. The discovery probe can be invoked as described with respect to the discovery probe 360 of FIG. 3. At operation 520, the technique 500 generates indications of one or more portions of the probe data. The technique 500 generates indications by marking or indicating the one or more portions of the probe data to be encrypted as described with respect to the hint annotator module 346 of FIG. 3. An indication can be generated for a portion of the probe data to be encrypted. An indication can be generated for more than one portion of the probe data to be encrypted. At operation 530, a message is generated. The message can include the probe data. The message can include the indications of the one or more portions to be encrypted. The message can include additional data. For example, the message can be generated as described with respect to the hint annotator module 346 of FIG. 3. At operation 540, the message is transmitted. The message can be transmitted to the gateway device.

Although the technique 500 is shown as a series of operations for clarity, implementations of the technique 500 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Figure 6:
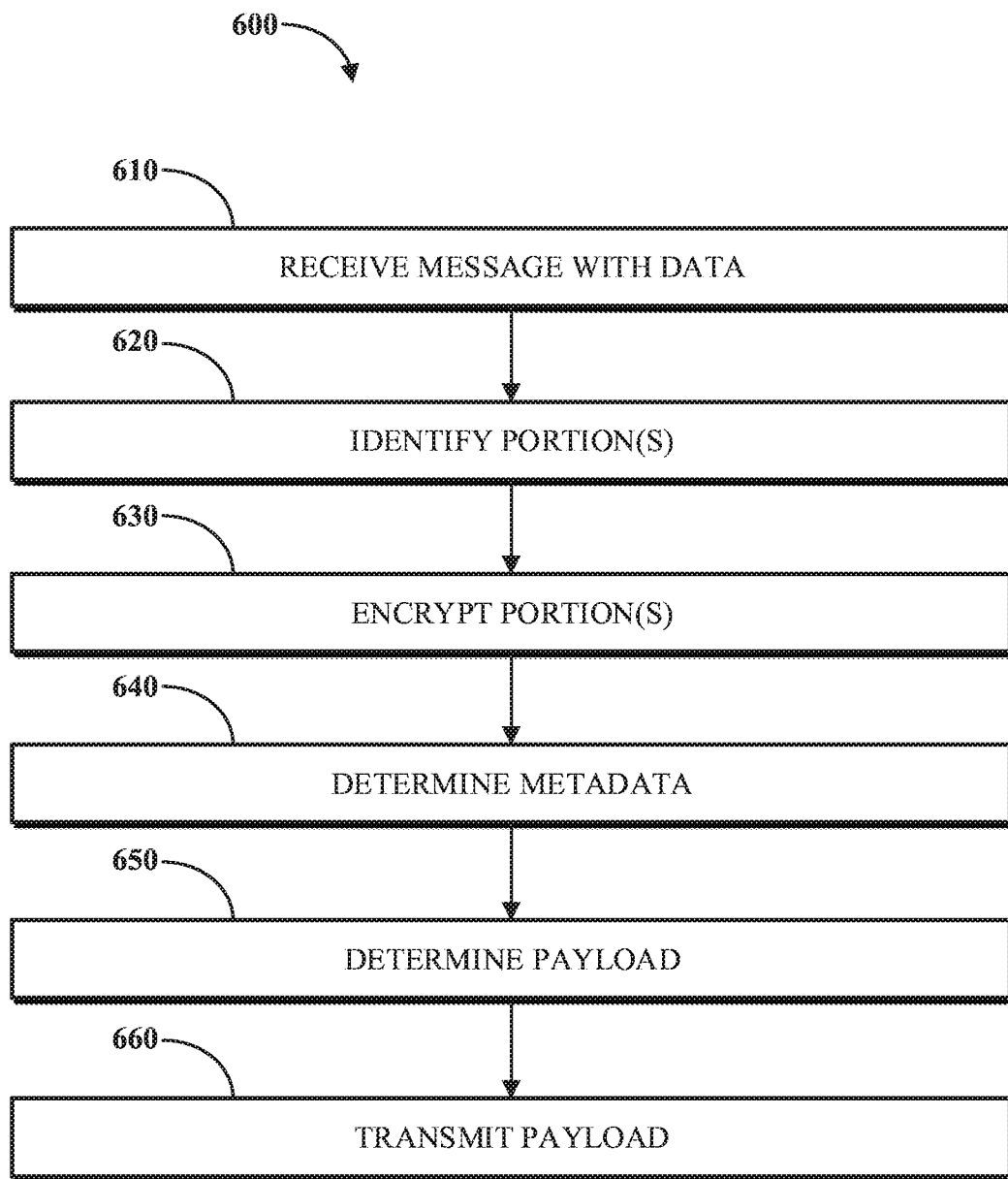
FIG. 6 is a flowchart illustrating an example of a technique for relaying encrypted data with metadata.

FIG. 6 is a flowchart illustrating an example of a technique 600 for relaying encrypted data with metadata in an electronic computing and communications system, such as the system 100 as generally illustrated in FIG. 1. In some implementations, the technique 600 can be executed using computing devices, such as the systems, modules, and devices described with respect to FIGS. 1, 2, and 3. In some implementations, the technique 600 can be performed, for example, by executing a machine-readable program or other computer-executable instructions, such as instructions or programs described according to JavaScript, C, or other such instructions. The steps, or operations, of the technique 600 or any other technique, method, process, or algorithm described in connection with the implementations disclosed herein can be implemented directly in hardware, firmware, software executed by hardware, circuitry, or a combination thereof.

The technique 600 includes receiving a message with data, at operation 610; identifying portions to be encrypted, at operation 620; encrypting the identified portions, at operation 630; determining metadata, at operation 640; determining a payload, at operation 650; and transmitting the payload, at operation 660.

At operation 610, the message is received. The message can be received at a gateway device, such as the gateway device 322 of FIG. 3. The message is to be forwarded to a server device, such as a server device running the platform instance 330 of FIG. 3. The message can be received such as described with respect FIG. 3. At operation 620, the technique 600 identifies portions of the received data to be encrypted. The portions to be encrypted can be identified based at least in part on one or more indications in the message. The indications can be as described with respect to the hint annotator module 346 of FIG. 3. The portions can be identified as described with respect to the detector module 342 of FIG. 3.

At operation 630, the technique 600 encrypts the identified portions. The technique 600 can encrypt the identified portions as described with respect to operation 430 of FIG. 4. At operation 640, the technique 600 determines metadata based on the one or more portions to be encrypted. The metadata can indicate one or more properties of a portion to be encrypted. The metadata can enable one or more operations to be performed by the server device. The operations can depend on the one or more properties of the metadata. For example, using the metadata described with respect to FIG. 9, the server device may determine whether an encrypted IP address is a private address or an IPV4 address when displaying information about the encrypted IP address or determining actions to take with respect to the encrypted IP address. The metadata can be determined as described with respect to the metadata generator 350 of FIG. 3.

At operation 650, the technique 600 determines a payload to be transmitted to the server device. The payload can include the data with both the encrypted portion and the metadata substituted for the portion of the data. For example, the payload can be generated as described with respect to the payload 374 of FIG. 3.

The metadata may indicate one or more properties of a portion of data identified for encryption. For example, the properties can include properties of an Internet protocol address. Some of the properties, including some of the properties of the Internet protocol address, can be indicated by Boolean values (i.e., Boolean flags). The metadata can be formatted based on, or as described in, an interface description language, such as the one described with respect to FIG. 9.

In some implementations, the message includes an indication of one or more portions of the data to be encrypted prior to forwarding. The indications can be as described with respect to the hint annotator module 346 of FIG. 3. The portions can be identified as described with respect to the detector module 342 of FIG. 3. The metadata can be determined based on the indication. In some implementations, the portion of the data to be encrypted includes a uniform resource locator (URL). The metadata based on the URL (i.e., the portion of the data) can include a substring of the URL (e.g., a path, a domain, or an HTTP get request parameter).

For example, the technique 600 can include operations that can be performed by an agent device, such as the agent device 320 of FIG. 3. The operations can include invoking a discovery probe against a target device to obtain probe data; generating the indication of the one or more properties of a portion of the probe data; and transmitting the data, including the probe data and the indication, for forwarding to the server device. The data can be forwarded to the gateway device. Invoking the discovery probe can be as described with respect to operation 510 of FIG. 5. Generating the indications can be as described with respect to operation 520 of FIG. 5. For example, the portion of the data may include a uniform resource locator (URL).

Although the technique 600 is shown as a series of operations for clarity, implementations of the technique 600 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

Figure 7:
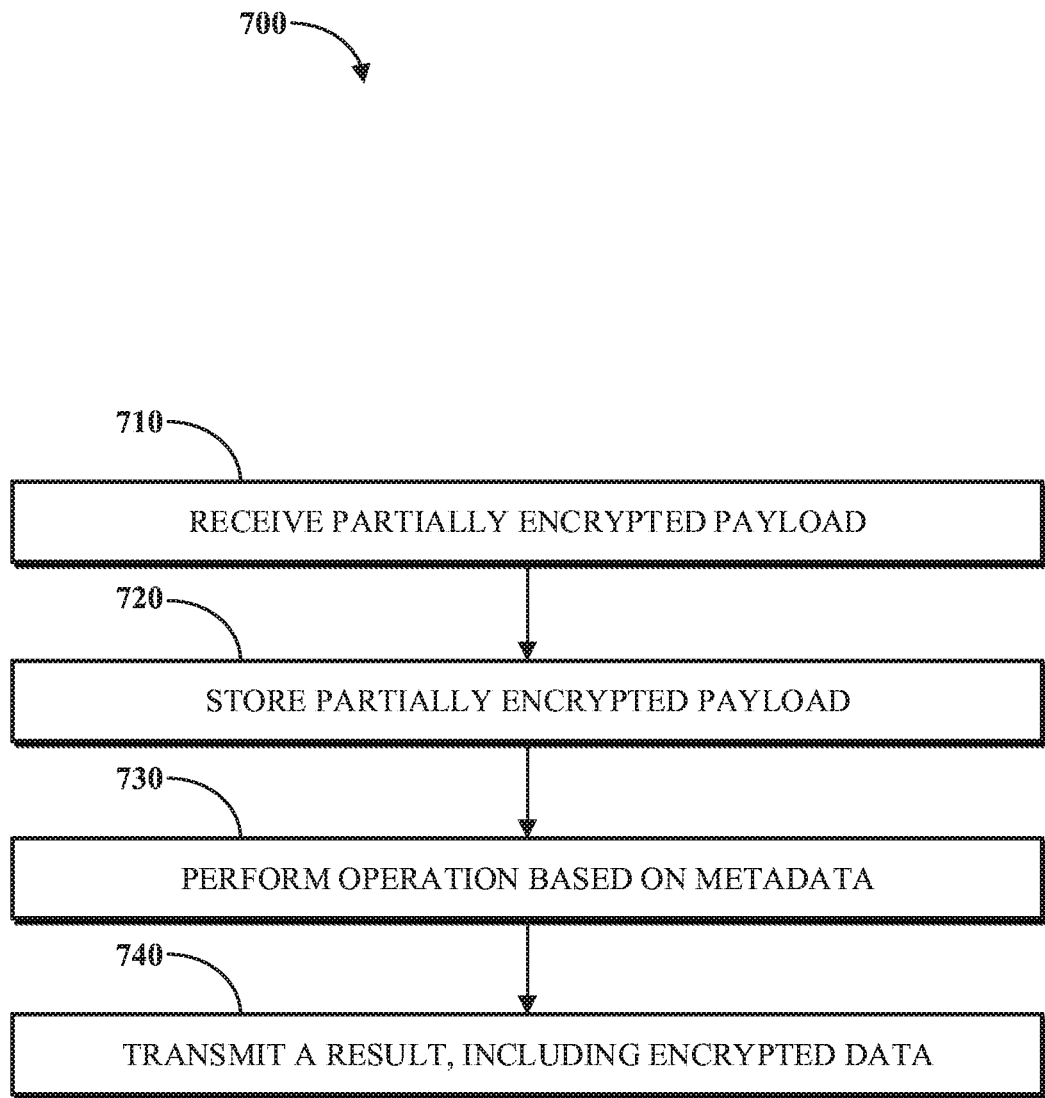
FIG. 7 is a flowchart illustrating an example of a technique for performing operations using metadata.

FIG. 7 is a flowchart illustrating an example of a technique 700 for performing operations using metadata in an electronic computing and communications system, such as the system 100 as generally illustrated in FIG. 1. In some implementations, the technique 700 can be executed using computing devices, such as the systems, modules, and devices described with respect to FIGS. 1, 2, and 3. In some implementations, the technique 700 can be performed, for example, by executing a machine-readable program or other computer-executable instructions, such as instructions or programs described according to JavaScript, C, or other such instructions. The steps, or operations, of the technique 700 or any other technique, method, process, or algorithm described in connection with the implementations disclosed herein can be implemented directly in hardware, firmware, software executed by hardware, circuitry, or a combination thereof.

In some implementations, the technique 700 includes receiving a partially encrypted payload, at operation 710; storing the partially encrypted payload, at operation 720; performing an operation based on metadata, at operation 730; and transmitting a result, at operation 740. The result can include encrypted data.

At operation 710, the technique 700 receives the partially encrypted payload. The partially encrypted payload can be received at a server device, such as a server running the platform instance 330 of FIG. 3. The partially encrypted payload can include one or more encrypted values (i.e., encrypted portions). For example, a value can be encrypted by a gateway device, such as the gateway device 322, as described with respect to FIG. 3. The partially encrypted payload can include unencrypted values. The partially encrypted payload can include metadata. A metadata can include properties and can be associated with an encrypted value of the partially encrypted payload. At operation 720, the technique 700 stores the partially encrypted payload. Storing the partially encrypted payload can include storing the metadata. The metadata is stored in a manner that is associated with the corresponding encrypted value. The partially encrypted payload can be stored as described with respect to the encrypted portion 376 of FIG. 3.

At operation 730, the technique 700 performs one of the one or more operations enabled by the metadata. The operation uses metadata. The operation can be performed by the server device using the metadata. At operation 740, the technique 700 transmits a result of the operation. In some implementations, the result can include the encrypted value. The technique 700 may include the one or more operations consistent with the description of the metadata interpreter module 352 of FIG. 3.

Although the technique 700 is shown as a series of operations for clarity, implementations of the technique 700 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

FIG. 8 is an illustration of generating a partially encrypted payload 850 based on received data 800 for transfer to a remote server. The received data 800 can be probe data, such as the probe data received by the gateway device 322 in the message 372 of FIG. 3. The received data 800 can be a message, such as a web-based message as described with respect to FIG. 3, received by the gateway device 322. The received data 800 includes portions 810, 812, 814, 816, and 818. The portions 812 and 816 are determined to be portions to be encrypted. For example, the portions 812 and 816 may be identified based on an indication included in the message bearing the received data 800. For example, the portions for encryption can be identified as described with respect to the detector module 342 of FIG. 3.

A device, such as the gateway device 322 of FIG. 3, can create the payload 850 based on the received data 800 for transmission to a server device, such as a server running the platform instance 330 of FIG. 3. The portions 810, 814, and 818 can be duplicated, reproduced, copied, or otherwise included in the payload 850. The portions 812 and 816 are substituted with the portions 862 and 866, respectively. In some implementations, the portions 862 and 866 include encrypted values of the portions 812 and 816, respectively. The portions 862 or 866 may also include metadata as described with respect to the metadata generator module 350 of FIG. 3.

Figure 9:
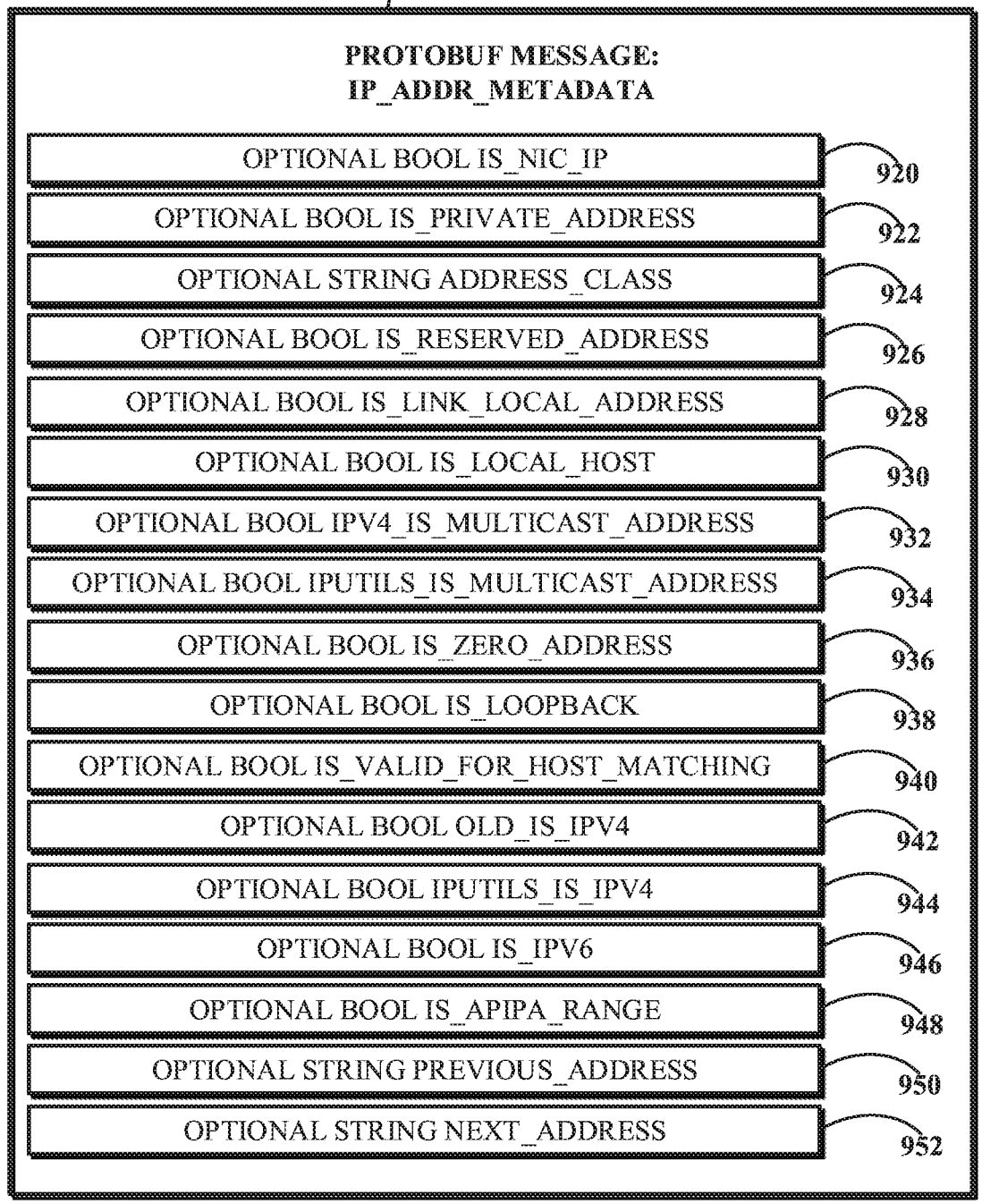
FIG. 9 is a memory map of an example data structure for metadata.

FIG. 9 is a memory map of an example data structure 910 for metadata. The metadata reflects properties of a portion of data (an IP address in this example), and can be formatted (i.e., defined or specified) using any suitable mechanism including, but not limited to, a protocol buffer, JSON, XML, a programming language (e.g., Java, C, C++, etc.) data structure, or an interface description language. The data structure 910 can be implemented as a protocol buffer message, which may be specified using an interface description language. A protocol buffer is a way of encoding structured data.

The data structure 910 includes the metadata 920-952. While the metadata 920-952 are indicated as optional, that need not be the case; other data structures can include optional, required, or other types of metadata. Optional fields can have default values. The metadata 920-952 may respectively have a corresponding data type. For example, the metadata 920, 922, 948 are Boolean variables, and the metadata 924, 950 are strings. Other data types for metadata are possible, including but not limited to double, float, integers, unsigned integers, etc.

The metadata 920 indicates whether the IP address is the IP address of the network interface card (NIC) of a device. The metadata 922 indicates that the IP address is a private IP address. A private address can be, for example, an IP in one of the ranges 192.168.0.0.1 to 192.168.255.255 or 172.16.0.0 to 172.31.255.255. The metadata 924 indicates the class of the IP address. The class can be one of A, B, C, D, or E. The metadata 926 indicates whether the IP is a reserved IP address. The metadata 928 indicates whether the IP address is a link-local address.

The metadata 930 identifies whether the IP address is, for example, the value 127.0.0.1. The metadata 932 identifies whether the IP address is an IPV4 multicast address. A multicast IPV4 address is one that can be defined by the leading bits 0b1110 and can be a logical identifier of a group of hosts in a computer network. The metadata 934 indicates whether the IP address is a multicast address that can be a logical identifier for a group of devices. The metadata 936 indicates whether the IP address is a zero IP address (e.g., 0.0.0.0), which can be indicative of an invalid IP address. The metadata 938 indicates whether the IP address is the loop back IP address (i.e., 127.0.0.1).

The metadata 940 indicates whether the IP address is valid for host matching. The metadata 942 indicates whether the IP address is an IPV4 IP address. The metadata 944 is a metadata indicating whether the IP address is an IPV4 IP address that is used by the API IPUtils. The metadata 946 indicates whether the IP address is an IPV6 IP address. The metadata 948 indicates whether the IP address is an IP address in the automatic private IP addressing (APIPA) range. The metadata 950 and 952 indicate the previous IP address and next IP address, respectively. These other IP addresses may be encrypted with their own metadata. In some implementations, a field in the metadata can itself be an encrypted value that can be returned and then processed based on its respective metadata.

Figure 10:
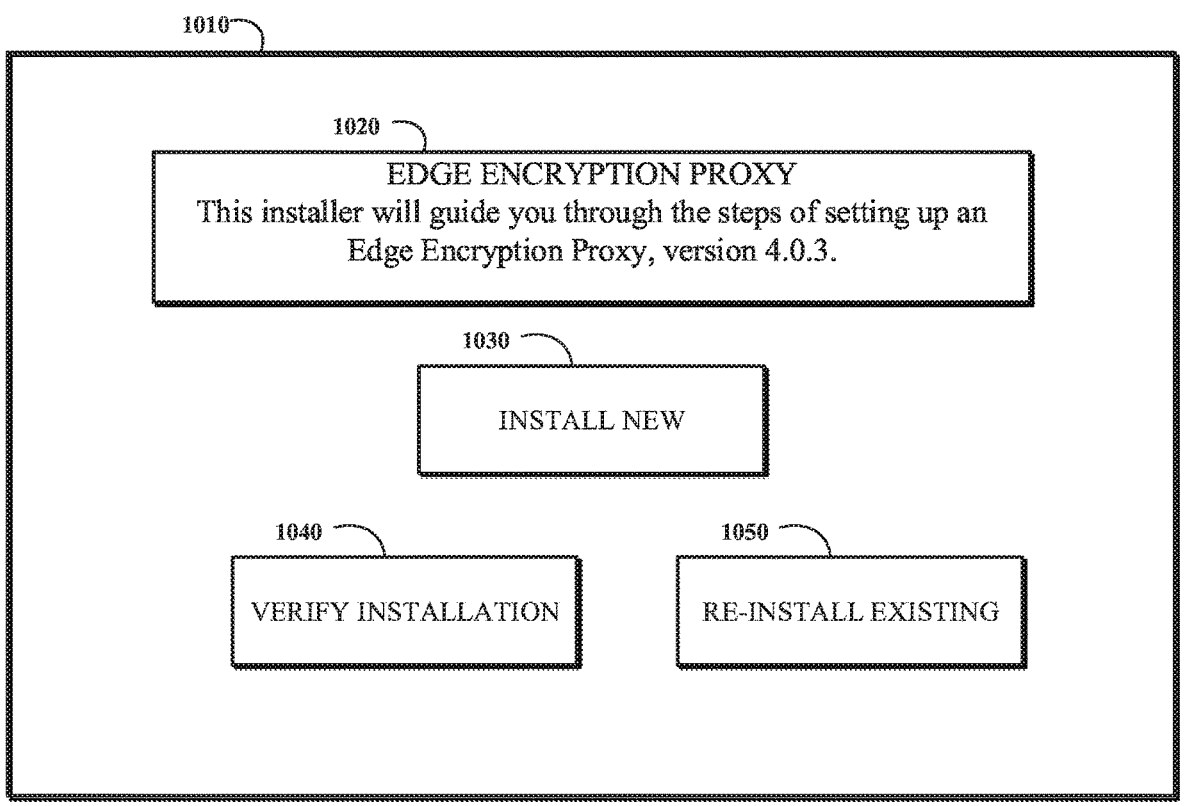
FIG. 10 is a diagram of an example display region generated for presenting information about installation of edge encryption software and receiving user commands related to installation.

FIG. 10 is a diagram of an example display region 1010 generated for presenting information about installation of edge encryption software and receiving user commands related to installation. For example, the display region 1010 may be generated by the user interface 344 of FIG. 3. For example, the display region 1010 may be presented in a display of a computing device in a customer environment (e.g., a display of the gateway device 322 or a display of the target device 312). For example, the display region 1010 may be presented using a web browser.

The display region 1010 includes a heading 1020 that may present basic information (e.g., version information) about edge encryption software that is available for installation to a user (e.g., a system administrator in a customer environment). The display region 1010 also includes an install icon 1030. A user may click on the install icon 1030 to initiate the installation of edge encryption software on a computing device in a customer environment (e.g., on the gateway device 322 in the customer environment 302).

The display region 1010 also includes a validation icon 1040. A user (e.g., a system administrator) may click on the validation icon 1040 to initiate a process to confirm that edge encryption proxy software is properly installed and configured on both a server in the customer environment (e.g., the gateway device 322) and a corresponding platform instance (e.g., the platform instance 330) for the customer environment. For example, clicking the validation icon 1040 may initiate a process that includes checking that the platform instance 330 is running a version of the metadata interpreter module 352 that is compatible with a version of the metadata generator module 350 installed and running on the gateway device 322.

The display region 1010 also includes a re-install icon 1050. A user (e.g., a system administrator) may click on the re-install icon 1050 to initiate a process to update an existing installation of edge encryption software. For example, clicking the re-install icon 1050 may cause an update request message to be relayed through the gateway device 322 to the platform instance 330. For example, the update request message may be processed as described in relation to FIG. 4 to cause an update of edge encryption software installed on the gateway device 322.

Figure 11:
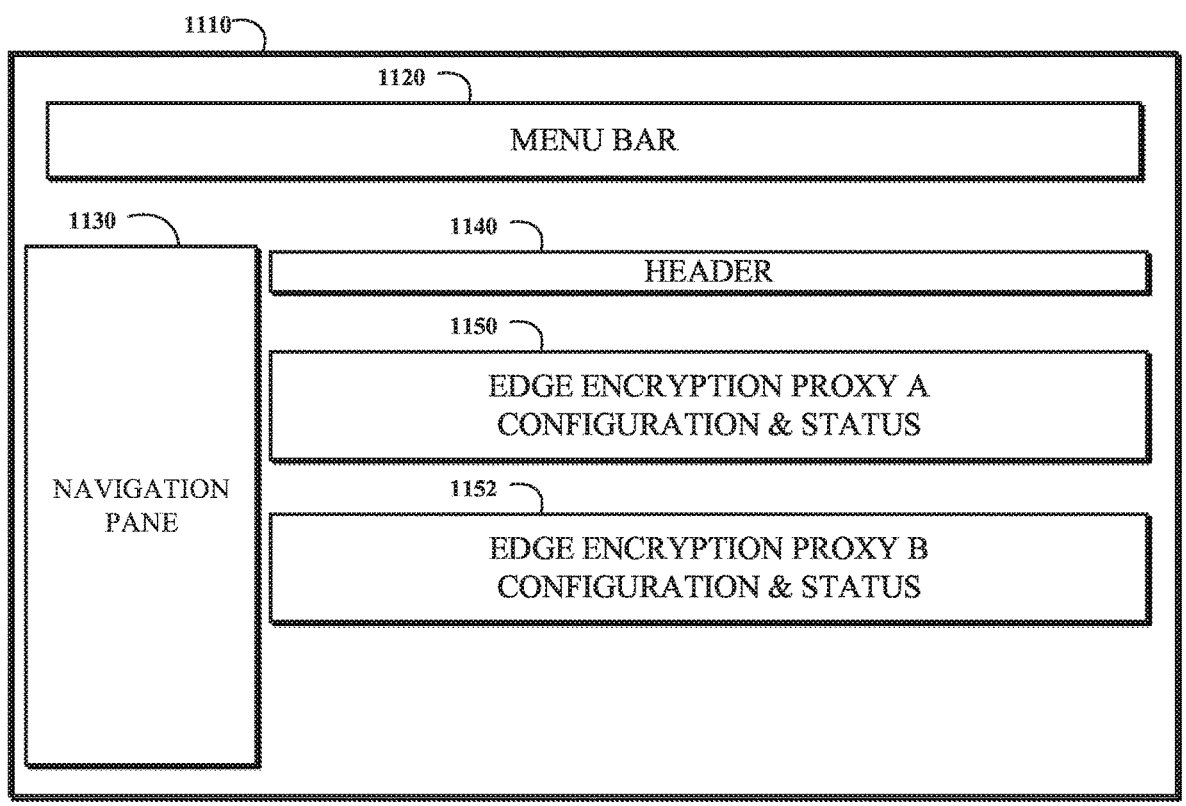
FIG. 11 is a diagram of an example display region generated for presenting information about the configuration and status of one or more edge encryption proxies in a private network.

FIG. 11 is a diagram of an example display region 1110 generated for presenting information about the configuration and status of one or more edge encryption proxies in a private network. The display region 1110 includes a menu 1120; a navigation pane 1130, a header 1140; and edge encryption proxy listings 1150 and 1152. For example, the display region 1110 may be generated by the user interface 344 of FIG. 3.

The menu 1120 may include a user icon reflecting the status of a currently logged in user, a search icon, a chat icon, a help icon, a setup icon, an options icon, and a proxy selection drop-down menu. The navigation pane 1130 may include a search box, a favorites icon, and a site map or tree. The header 1140 may list column headings that may include names for attributes of proxies that are displayed in the area of the display region 1110 below the header 1140.

The area of the display region 1110 below the header 11140 may include one or more edge encryption proxy listings for edge encryption proxies available within a private network. In this example, two edge encryption proxy listings 1150 and 1152 are displayed below the header 1140. The edge encryption proxy listings 1150 and 1152 may display values of attributes of corresponding edge encryption proxies. For example, an edge encryption proxy listing (e.g., listing 1150 or listing 1152) may include a name of an edge encryption proxy; an identifier for an associated database (e.g., a data base managed by a platform instance); a current status (e.g., online or unresponsive) for the edge encryption proxy; a current status (e.g., online or unresponsive) for the associated database; a proxy version; a proxy build; a default encryption key identifier and/or icon (e.g., for a 128 bit or 256 bit encryption key); a global unique identifier; a status update interval (e.g., in minutes); binary configuration parameters (e.g., is 256 bit encryption supported); a time of the last response from the edge encryption proxy; and/or a time the proxy was last taken offline (e.g., for maintenance).

An implementation of this disclosure is a system for encrypting portions of data for storage and processing in a remote network. The system includes a means for receiving a message that includes data for forwarding to a server device; a means for encrypting a portion of the data to determine an encrypted portion; a means for determining metadata based on the portion of the data, wherein the metadata indicates one or more properties of the portion of the data and enables one or more operations to be performed by the server device that depend on the one or more properties; a means for determining a payload including the data with both the encrypted portion and the metadata substituted for the portion of the data; and a means for transmitting the payload to the server device.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).
device.

What is claimed is:

1. A system operable to process encrypted data, the system comprising:
   a memory; and
   a hardware processor;
   wherein the memory includes instructions executable by the hardware processor to cause the system to perform operations comprising:
      receiving a payload from a customer environment, wherein the payload comprises an encrypted portion of data and metadata, wherein the metadata is generated based on a portion of data that was encrypted to generate the encrypted portion of data, wherein the metadata is configured to describe one or more properties of the portion of data that was encrypted to generate the encrypted portion of data, wherein the one or more properties include one or more of the following: a request-type property, a served-by property, a summary property, a domain property, or a port property, or any combination thereof;
      performing an operation on the encrypted portion of data based at least in part on the one or more properties indicated by the metadata to generate a result, wherein the operation comprises a filtering operation, a sorting operation, a grouping operation, an ordering operation, or a comparing operation, or any combination thereof, and wherein the operation is performed without decrypting the encrypted portion of data; and
      transmitting the result for storage, for additional processing, to another device, to the customer environment, or any combination thereof.

2. The system of claim 1, wherein the encrypted portion of data includes information related to one or more of the following: an internet protocol (IP) address, a host name, a credential, a Social Security number, a user identifier, an operating system version, an operating system patch level, a uniform resource locator (URL), a class, a name, a credit card number, a user login credential, a user password, a binary large object, a journal field, an attachment, or any combination thereof.

3. The system of claim 1, wherein the encrypted portion of data comprises cypher-text.

4. The system of claim 1, wherein the metadata comprises encoded data before performing the operation based on the one or more properties.

5. The system of claim 1, wherein the customer environment is configured to be deployed within a private client network deployed separate from a network associated with the hardware processor.

6. The system of claim 1, wherein the metadata comprises one or more of the following: a subset of the portion of data that was encrypted to generate the encrypted portion of data, a substring of the portion of data that was encrypted to generate the encrypted portion of data, a value inferred from the a subset of the portion of data that was encrypted to generate the encrypted portion of data, a value extracted from data accompanying the portion of data that was encrypted to generate the encrypted portion of data, or any combination thereof.

7. The system of claim 1, wherein the instructions are configured to cause the hardware processor to receive the payload from the customer environment after validating a version of a software associated with the customer environment.

8. The system of claim 1, wherein the instructions are configured to cause the hardware processor to determine the one or more properties indicated by the metadata based at least in part on a memory map configured to associated a property of the encrypted portion of data to a portion of the metadata.

9. A method for operating a server device, comprising:
   determining that a payload comprises metadata and an encrypted portion of data, wherein the metadata is configured to describe one or more properties associated with the encrypted portion of data or with a customer environment, and wherein the one or more properties include one or more of the following: a request-type property, a served-by property, a summary property, a domain property, or a port property, or any combination thereof;
   performing an operation on the encrypted portion of data based at least in part on the one or more properties indicated by the metadata to generate a result, wherein the operation comprises performing a database query, executing a user interface operation, a filtering operation, a sorting operation, a grouping operation, an ordering operation, a comparing operation, or any combination thereof, and wherein the operation is performed using the metadata as opposed to decrypting the encrypted portion of data; and
   transmitting the result and the encrypted portion of data to the customer environment.

10. The method of claim 9, comprising decoding the metadata to obtain the one or more properties indicated by the metadata.

11. The method of claim 9, comprising interpreting the metadata to determine the request-type property, the served-by property, the summary property, the domain property, the port property, an identifier, a range, an address indication, a class, or any combination thereof associated with the encrypted portion of data or of the customer environment.

12. The method of claim 11, wherein the one or more properties also include the identifier, the range, the address indication, the class, or any combination thereof.

13. The method of claim 9, comprising:
   determining that a first portion of the payload comprises the encryption portion of data and that a second portion of the payload comprises the metadata, wherein the metadata comprises one or more of the following: a double data type, a float data type, an integer data type, an unsigned integer data type, a Boolean variable, or any combination thereof; and determining a type, a value, or both of the one or more properties indicated by the second portion of the payload.

14. The method of claim 9, comprising:
determining that a first portion of the payload comprises the encrypted portion of data and that a second portion of the payload comprises the metadata, wherein the metadata comprises a plurality of Boolean variables; and
determining a type, a value, or both of the one or more properties indicated by the second portion of the payload regarding the first portion of the payload based at least in part on a relative position of a respective variable of the plurality of Boolean variables.

15. The method of claim 9, comprising:
receiving an indication from the customer environment to perform a validation operation;
running a version of a metadata interpreter module installed on the customer environment to generate a validation result;
determining from the validation result that the customer environment is compatible for communication with the server device; and
transmitting an indication of compatibility to the customer environment, wherein the customer environment is configured to transmit the payload in response to receiving the indication of compatibility.

16. A non-transitory computer-readable medium comprising instructions that, when executed by a processor, cause the processor to perform operations comprising:
receiving metadata and an encrypted portion of data associated with private information of a customer environment, wherein the metadata is configured to describe one or more properties associated with the encrypted portion of data or with the customer environment, and wherein the one or more properties include one or more of the following: a request-type property, a served-by property, a summary property, a domain property, or a port property, or any combination thereof;
performing, using the metadata, a computing operation on the encrypted portion of data based at least in part on the one or more properties indicated by the metadata to generate a result, wherein the computing operation comprises a filtering operation, a sorting operation, a grouping operation, an ordering operation, or a comparing operation, or any combination thereof, and wherein the computing operation is performed without decrypting the encrypted portion of data; and
transmitting the result and the encrypted portion of data to the customer environment.

17. The non-transitory computer-readable medium of claim 16, wherein receiving the metadata and the encrypted portion of data comprises receiving the metadata and the encrypted portion of data from an agent device associated with a deployment of the customer environment.

18. The non-transitory computer-readable medium of claim 16, wherein the one or more properties comprises one or more of the following: an identifier, a range, an address indication, a class, or any combination thereof.

19. The non-transitory computer-readable medium of claim 16, wherein the operations comprise decoding the metadata before using the metadata to perform the computing operation.

20. The non-transitory computer-readable medium of claim 16, wherein the metadata comprises one or more of the following: a subset of a portion of data that was encrypted to generate the encrypted portion of data, a substring of the portion of data that was encrypted to generate the encrypted portion of data, a value inferred from the a subset of the portion of data that was encrypted to generate the encrypted portion of data, a value extracted from data accompanying the portion of data that was encrypted to generate the encrypted portion of data, or any combination thereof.

* * * * *